UNITED STATES PATENT OFFICE.

BURT S. HARRISON, OF BROOKLYN, NEW YORK, ASSIGNOR TO CARRIER ENGINEERING CORPORATION, OF NEW YORK, N. Y.

METHOD OF DRYING VEGETABLES AND FRUITS.

1,387,710.      Specification of Letters Patent.      Patented Aug. 16, 1921.

No Drawing.      Application filed August 3, 1918. Serial No. 248,113.

*To all whom it may concern:*

Be it known that I, BURT S. HARRISON, a citizen of the United States, residing at 12 Clifton Place, Brooklyn, in the county of Kings and State of New York, have invented a new and useful Improvement in Methods of Drying Vegetables and Fruits, of which the following is a specification.

This invention relates to a method of drying vegetables and fruits.

When certain vegetables and fruits are peeled or sliced, the surfaces thus exposed to the air rapidly become darkly discolored due to oxidizing in the presence of the enzyms. In order to avoid this oxidation with its consequent discoloration, it has been customary in drying processes heretofore practised to blanch, or parboil, the slices before putting them into the drier. The blanching, however, has certain objectionable features. In the case of potatoes, for instance, it hydrolyzes the starch and gelatinizes the cells so that the dried slices have a translucent appearance and require to be soaked for a considerable period of time before they will regain the water they have lost and be fit for use. If dried too hard, even four to six hours soaking will not restore the slices to anything like the condition of pliability of raw sliced potatoes.

The object of this invention is to produce a commercially practical and economical method of drying vegetables and fruits whereby oxidation and discoloration of the material is prevented and the dried material will regain water and be restored more nearly to its original condition by soaking in cold water for a much shorter time than is required for fruits and vegetables dried by prior methods.

In drying fruits and vegetables such for instance as potatoes, by this method the sliced potatoes are preferably put through a bath of ordinary table salt solution, or other saline solution which will temporarily protect the exposed surfaces of the potatoes and prevent oxidation or the action of the ferments and enzyms until the potatoes enter the drier. They are then put directly into a suitable drier without first blanching or parboiling them. In order to reduce the oxidizing effect of the hot air or drying medium on the potatoes in the drier, a suitable quantity of the products of combustion, carbon dioxid ($CO_2$) nitrogen or other suitable inert or non-oxidizing gas is introduced into the drier. The inert gas can be used in the drier either in entirety or in suitable proportion with fresh or recirculated air, or in the first stage of the drying process. The temperature and humidity in the drier are also preferably controlled by any known or suitable temperature and humidity controlling means.

Potatoes dried in the manner described come out white instead of translucent (gelatinized) and they will regain water and be softened and restored to a condition practically like fresh raw potatoes and be capable of similar uses by soaking them for only about twenty to thirty minutes in cold water. They lose nothing by the drying process except water and the ferment.

I claim as my invention:

1. The hereindescribed method of drying fruits and vegetables consisting in slicing the material, treating the sliced material with a solution which prevents oxidization of the material, and then drying the material in a heated drying medium in the presence of an inert or non-oxidizing agent.

2. The hereindescribed method of drying fruits and vegetables consisting in slicing the material, treating the sliced material with a saline solution which prevents oxidation of the material, and then drying the material in the presence of an inert or non-oxidizing gas.

3. The hereindescribed method of drying fruits and vegetables consisting in slicing the material, treating the sliced material with a solution which prevents oxidation of the material, and then placing the material without blanching or parboiling in a drier into which an inert or non-oxidizing gas is introduced.

4. The hereindescribed method of drying fruits and vegetables consisting in slicing the material, treating the sliced material with a solution which prevents oxidation of the material, and then subjecting the material to the drying action of heated air and an inert or non-oxidizing gas.

5. The hereindescribed method of drying fruits and vegetables consisting in slicing the material, treating the sliced material with a solution which temporarily prevents oxidation of the material, and then subjecting the material to the drying action of heated air and an inert or non-oxidizing agent.

Witness my hand, this 30th day of July, 1918.

BURT S. HARRISON.

Witnesses:
 ALFRED CHARLES BUENSOD.
 WILLIAM H. GEE.